(12) United States Patent
Lei et al.

(10) Patent No.: US 8,956,479 B2
(45) Date of Patent: Feb. 17, 2015

(54) MATERIALS AND METHODS FOR THE REMOVAL OF SULFUR COMPOUNDS FROM FEEDSTOCK

(75) Inventors: Hanwei Lei, Albuquerque, NM (US); Maha Hammoud, Ann Arbor, MI (US); Adam Rand, Petoskey, MI (US); Liya Wang, Ann Arbor, MI (US)

(73) Assignee: A123 Systems LLC, Livonia, MI (US)

( * ) Notice: Subject to any disclaimer, the term of this patent is extended or adjusted under 35 U.S.C. 154(b) by 513 days.

(21) Appl. No.: 12/704,591

(22) Filed: Feb. 12, 2010

(65) Prior Publication Data
US 2011/0014102 A1    Jan. 20, 2011

Related U.S. Application Data

(60) Provisional application No. 61/152,095, filed on Feb. 12, 2009.

(51) Int. Cl.
| | |
|---|---|
| *C03B 29/00* | (2006.01) |
| *C04B 35/00* | (2006.01) |
| *C04B 35/52* | (2006.01) |
| *B01J 20/02* | (2006.01) |

(Continued)

(52) U.S. Cl.
CPC .......... *B01J 20/0214* (2013.01); *B01J 20/0244* (2013.01); *B01J 20/0251* (2013.01); *B01J 20/0255* (2013.01); *B01J 20/0259* (2013.01); *B01J 20/06* (2013.01); *B01J 20/28004* (2013.01); *B01J 20/28026* (2013.01); *B01J 20/34* (2013.01); *C10G 25/003* (2013.01); *B22F 1/02* (2013.01); *B22F 9/22* (2013.01); *C04B 35/457* (2013.01); *C04B 35/5607* (2013.01); *C04B 35/62831* (2013.01); *C22C 32/00* (2013.01); *B01J 2220/42* (2013.01); *C04B 2235/3239* (2013.01); *C04B 2235/3293* (2013.01); *C04B 2235/3418* (2013.01); *C04B 2235/40* (2013.01); *C04B 2235/48* (2013.01)
USPC ............................... 156/89.11; 501/1; 501/87

(58) Field of Classification Search
USPC ........................ 501/87, 1; 423/230; 156/89.11
See application file for complete search history.

(56) References Cited

U.S. PATENT DOCUMENTS 3,488,291 A * 1/1970 Hardy et al. .................. 252/642
3,846,084 A * 11/1974 Pelton ........................... 428/565

(Continued)

OTHER PUBLICATIONS

Cheah, et al. "Review of Mid-to-High-Temperature Sulfur Sorbents for Desulferization of Biomass-and Coal-derived Syngas", Energy Fuels Review, Oct. 16, 2009, DOI: 10.1021/ef900714q.

*Primary Examiner* — Alex Efta
(74) *Attorney, Agent, or Firm* — Alleman Hall McCoy Russell & Tuttle LLP

(57) ABSTRACT

A composite material having utility for removing sulfur from a feedstock comprises a ceramic matrix having a relatively low melting point metal such as tin, zinc, lead or bismuth nanodispersed therein. The material may be prepared from a mixture of particles of a precursor of the ceramic matrix and precursor of the metal. The precursors are selected such that the melting point of the precursor of the ceramic is less than the melting point of the precursor of the metal. The mixture of precursor materials is heated to a temperature sufficient to melt the precursor of the ceramic material so as to coat it onto the precursor of the metal. The ceramic precursor is then reacted so as to convert it to a ceramic. Thereafter, the precursor of the metal is converted to a free metal which is retained within the ceramic matrix so as to prevent agglomeration.

10 Claims, 2 Drawing Sheets

(51) Int. Cl.
*B01J 20/06* (2006.01)
*B01J 20/28* (2006.01)
*B01J 20/34* (2006.01)
*C10G 25/00* (2006.01)
*B22F 1/02* (2006.01)
*B22F 9/22* (2006.01)
*C04B 35/457* (2006.01)
*C04B 35/56* (2006.01)
*C04B 35/628* (2006.01)
*C22C 32/00* (2006.01)

(56) References Cited

U.S. PATENT DOCUMENTS

| | | | |
|---|---|---|---|
| 4,079,163 | A | 3/1978 | Tanaka et al. |
| 4,130,854 | A | 12/1978 | Hertz |
| 5,869,019 | A * | 2/1999 | Seegopaul .................... 423/440 |
| 2007/0140891 | A1 | 6/2007 | Hassanzadeh et al. |
| 2009/0179181 | A1 | 7/2009 | Zhang et al. |

* cited by examiner

MATERIALS AND METHODS FOR THE REMOVAL OF SULFUR COMPOUNDS FROM FEEDSTOCK

CROSS-REFERENCE TO RELATED APPLICATION

This application claims priority of U.S. Provisional Patent Application Ser. No. 61/152,095 filed Feb. 12, 2009, which is incorporated herein by reference.

FIELD OF THE INVENTION

This invention relates to materials which can be used to remove sulfur contaminants such as hydrogen sulfide and organosulfur compounds from hydrocarbons and other chemical feedstocks. The invention also relates to methods for making the materials and to methods for their use.

BACKGROUND OF THE INVENTION

Sulfur is often a contaminant in hydrocarbons and in materials derived from hydrocarbons. Sulfur compounds such as hydrogen sulfide, as well as mercaptans, thiols, and other organosulfur compounds can present a problem with subsequent use of such materials since, in addition to being pollutants, they are chemically reactive and can poison catalysts and corrode a variety of equipment. In a number of applications, fuel cells are run on a feedstock material comprising a reformate derived from a hydrocarbon material such as JP8 fuel. This reformate is a hydrogen rich fuel stream which will also include sulfur materials derived from the hydrocarbon source. As noted, such sulfur materials can be very detrimental to fuel cell catalysts and membranes. Therefore, the prior art has implemented a number of approaches to providing methods and materials for removing sulfur contaminants from feedstock materials. In typical prior art approaches, metal oxide compounds such as iron oxide, zinc oxide, and the like have been used to scavenge hydrogen sulfide and other compounds from feedstock materials. In other instances, elemental iron has been used as a sorbent material in guard beds for protecting catalysts from trace sulfur impurities. Such materials are disclosed, for example, in a publication entitled "Review of Mid- to High-Temperature Sulfur Sorbents for Desulfurization of Biomass- and Coal-derived Syngas" Energy Fuels DOI: 10.1021/ef9007149 (Jul. 11, 2009). Problems have been encountered in the use of prior art materials since, in some instances, the chemical kinetics of the sulfidation of the absorbent material are unduly slow. Furthermore, it is desirable that any sulfur absorbent material be capable of being easily regenerated for reuse, and the chemical kinetics of the regeneration reaction are unfavorable for many prior art materials.

Accordingly, there is a need for a material which is capable of rapidly removing sulfur compounds from a feedstock. The material should also have a high specific capacity for the removal of sulfur compounds, and it is further desirable that the material be capable of being easily regenerated for reuse. As will be explained hereinbelow, the present invention provides a composite material which comprises a ceramic matrix having a nanoscale dispersal of a reactive sulfur-absorbing metal therein. The material of the present invention is stable in use, capable of absorbing large amounts of sulfur, and capable of being easily regenerated. These and other advantages of the present invention will be apparent from the drawings, discussion, and description hereinbelow.

SUMMARY OF THE INVENTION

Disclosed herein is a method for preparing a composite material which comprises a ceramic matrix having a metal nanodispersed therein. According to the method, a precursor of the ceramic material is provided, and a precursor of the metal is provided. The precursor of the metal has a melting point which is greater than the melting point of the precursor of the ceramic. The two precursors are mixed so as to produce a mixture comprised of particles of the precursor of the ceramic matrix and particles of the precursor of the metal. The mixture is heated to a temperature which is greater than the melting point of the precursor of the ceramic matrix and less than the melting point of the precursor of the metal. In this manner, particles of the precursor of the metal are at least partially coated with the precursor of the ceramic. Thereafter, a conversion reaction is carried out which converts the precursor of the ceramic into the ceramic matrix. The reaction is carried out at a temperature which is just less than the melting point of the precursor of the metal. Thereafter, a conversion reaction is carried out which converts the precursor of the metal into the metal thereby producing the composite material.

In particular instances, the precursor of the ceramic matrix is a vanadium-oxygen material and the conversion reaction is a carburizing reaction which converts the vanadium-oxide precursor to a vanadium-carbide ceramic. In some instances, the vanadium-oxygen precursor material is an oxide of vanadium and/or ammonium vanadate. The metal may comprise, in some instances, one or more of tin, zinc, lead, and bismuth. The precursor of the metal may be an oxide or sulfide of the metal, and the conversion reaction may be a reduction reaction.

In some instances, an agglomeration inhibitor such as carbon, a carbon precursor, or silica is added to the precursor mixture. In specific instances, the weight percentage of metal in the composite material is in the range of 60-70%.

Also disclosed is a method for reducing the concentration of a sulfur compound in a feedstock material. According to the method a sulfur-absorbing material comprising a ceramic matrix having a metal dispersed therein is contacted with the feedstock so that the metal in the composite material will react with the sulfur in the feedstock. In some instances, the sulfur-absorbing composite material may be regenerated so as to remove absorbed sulfur therefrom. Regeneration may be accomplished by a reduction reaction or an oxidation reaction depending upon the materials.

Further disclosed is a material which comprises a nanodispersion of a metal in a ceramic matrix wherein the metal is present in the form of domains having a size of no more than 1 micron, and in particular instances a size of no more than 500 nanometers. In a particular instance, the material comprises a matrix of vanadium carbide having a low melting metal such as tin, lead, bismuth, or mixtures thereof nano dispersed therein. The material may further include an inert agglomeration inhibitor such as silica or a carbon species therein.

DETAILED DESCRIPTION OF THE PREFERRED EMBODIMENTS

Figure 1:
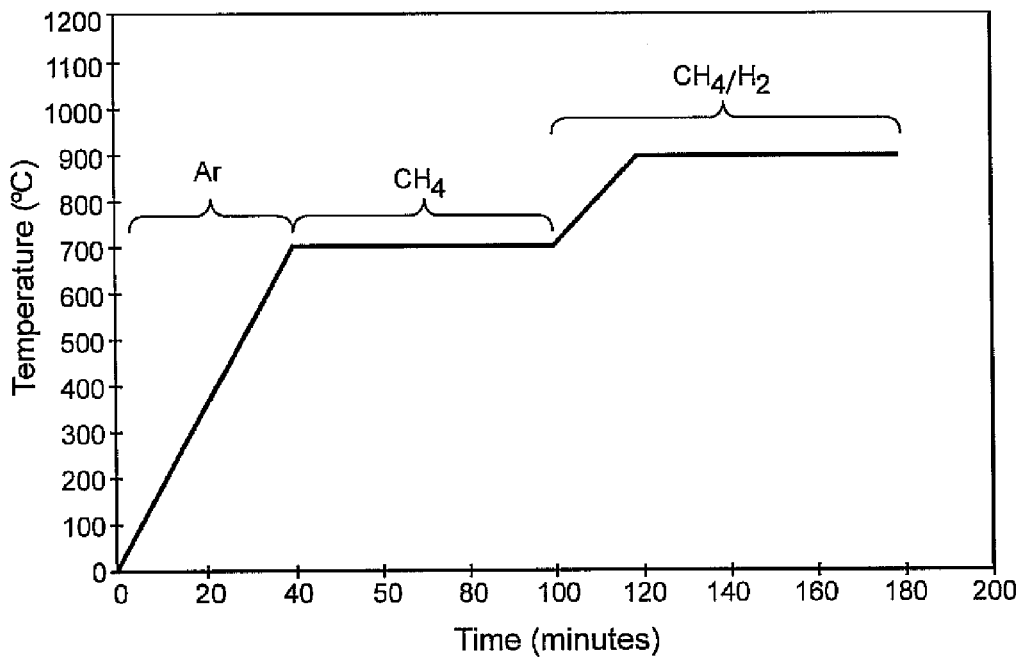
FIG. 1 is a graph showing the time-temperature profile of a reaction used to prepare a material of the present invention.

The present invention is directed to a composite material comprising a ceramic matrix having a metal nanodispersed therein. The ceramic matrix is, in specific embodiments, comprised of one or more nitride, oxide, carbide, boride, silicide, carbonitride or the like of a metal. In specific instances, the metal is a transition metal. One particular ceramic matrix having utility in the present invention is a vanadium carbide ceramic. In particular instances, the ceramic matrix is a porous, high surface area material.

The metal component is nanodispersed in the matrix, and in that regard it should be understood that in the context of this disclosure, a metal which is "nanodispersed in the matrix" may be dispersed within the ceramic, and/or it may be present on a surface of the ceramic, as for example, within the pores of a porous ceramic matrix, or on the surface of a particulate matrix. The metal component is typically present in the form of a number of spaced apart small domains, each domain having a size of 1 micron or less. In particular instances, the domains have a size of no more than 500 nanometers, and in some instances, the domains are smaller yet. In particular instances, the metal component is comprised of one or more metals having a relatively low melting point, and some specific metals having utility in this regard are tin and zinc. Other metals having utility include lead, bismuth, and the like. It is to be understood that the metal component may comprise an alloy of several metals. Also, two or more different metals or alloys may be dispersed through the matrix.

The amount of metal in the materials of the present invention can vary, depending on the nature of the metal and the ceramic. In general, the level of metal loading should not be so high as to preclude maintaining the nanodispersion. Typical metal loadings will range, on a weight basis, up to about 85%. There is no strict lower limit for metal loading; however, for reasons of practicality, materials used as sulfur removal agents should have a fairly high metal loading. In general, metal loadings, on a weight basis, will be in the range of 30-85%. In some specific instances, loadings will be 50-80% by weight, and in particular instances 60-70% by weight.

The materials of the present invention may be prepared in a multistage temperature programmed reaction method. In the first stage of the method, a precursor compound of the metal and a precursor compound of the ceramic are mixed together, as for example by ball milling, so as to create an intimate mixture of the two. This mixture is then heated under appropriate reaction conditions so as to convert the precursor of the ceramic into a ceramic material and the precursor of the metal into a metal. In accord with one aspect of the present invention, the precursor materials and reaction conditions are selected so that in a first stage of the process the precursor of the ceramic forms a ceramic coating around the precursor of the metal. In a subsequent step of the process, the metal precursor is converted to the metal. The ceramic body surrounding the molten metal prevents it from agglomerating. Furthermore, the molten metal can penetrate pores in the ceramic producing a still further dispersed material.

In a typical process of the present invention, a nanodispersion of tin in or onto a VC matrix is prepared in a temperature programmed reaction utilizing tin oxide and vanadium oxide as starting materials. In a first step of the process, a ball milled mixture of tin oxide and vanadium oxide is heated under non-reducing conditions to a temperature above the melting point of the vanadium oxide so that the molten vanadium oxide coats the tin oxide particles. In a second step of the process, the reaction mixture is heated under carburizing conditions so as to convert the vanadium oxide to vanadium carbide. In a subsequent step, the mixture is then heated under strong reducing conditions so as to convert the tin oxide to tin metal which at least partially permeates or coats the previously formed vanadium carbide. In a final step, the material is ground to produce the finished sulfur absorbent. As will be apparent to one of skill in the art, other precursor materials having appropriate melting points and reactivities may be used in this process. For example, the VC precursor may be another vanadium-oxygen material such as ammonium vanadate, a vanadium suboxide or the like.

It has been found that, in some instances, performance of the composite material may be further enhanced if an additional agglomeration inhibitor is incorporated into the precursor mixture. This additional agglomeration inhibitor may comprise silica, which may be in the form of fumed silica. In other instances it may be carbon or a carbon precursor, such as a polymeric material which carbonizes during the preparation of the composite. These additional inhibitor materials may be used in various amounts, and are typically employed in concentrations of up to 50% by weight. In particular instances they are utilized in amounts of up to 20% by weight; although it is to be understood that in a number of embodiments, additional inhibitor materials are not necessary.

The materials of the present invention are highly effective for removing hydrogen sulfide and other sulfur materials from hydrogen streams, hydrocarbon streams, and other chemical feedstocks. In a typical process, the sulfur compound removal takes place at a temperature above the melting temperature of the nanodispersed metal. The fact that the metal is contained by the ceramic matrix prevents the molten metal from agglomerating, thereby maintaining its high surface area. It has been found that materials of the present invention are very stable under use conditions because of the ceramic matrix. It has also been found that the sulfur removing materials may be readily regenerated. In some instances, regeneration may be accomplished by heating, and such heating may be under either reducing or oxidizing conditions. In a particular instance, it has been found that heating in a hydrogen atmosphere is highly effective for regenerating a tin-based material.

A particulate nanocomposite material was prepared in accord with the foregoing general principles. This material comprises tin which is nanodispersed in a matrix of a vanadium carbide ceramic further including an inert silica agglomeration inhibitor dispersed therethrough. This material was prepared from a starting mixture which included, on a weight basis, 31% $V_2O_5$, 51% $SnO_2$, and 18% fumed silica. The particulate materials were mixed by ball milling for a period of one week utilizing a ceramic milling medium and an acetone solvent. The thus produced starting mixture was then subjected to a temperature programmed reaction (TPR).

The time-temperature profile of the TPR reaction is shown in FIG. 1. As will be seen, the reaction mixture is heated from room temperature to 700° C. over approximately 40 minutes in an inert atmosphere (Ar). Under these conditions, the vanadium oxide begins to melt and coat the surface of the tin oxide which remains solid. Thereafter, the mixture is maintained at a temperature of 700° C. for a period of approximately 1 hour while a carburizing ($CH_4$) atmosphere is introduced. The carburizing atmosphere converts the vanadium oxide to vanadium carbide which forms a hard shell on the particles of tin oxide. Following the one hour reaction time, $H_2$ is added to the $CH_4$ atmosphere and the temperature is raised from 700°

Figure 2:
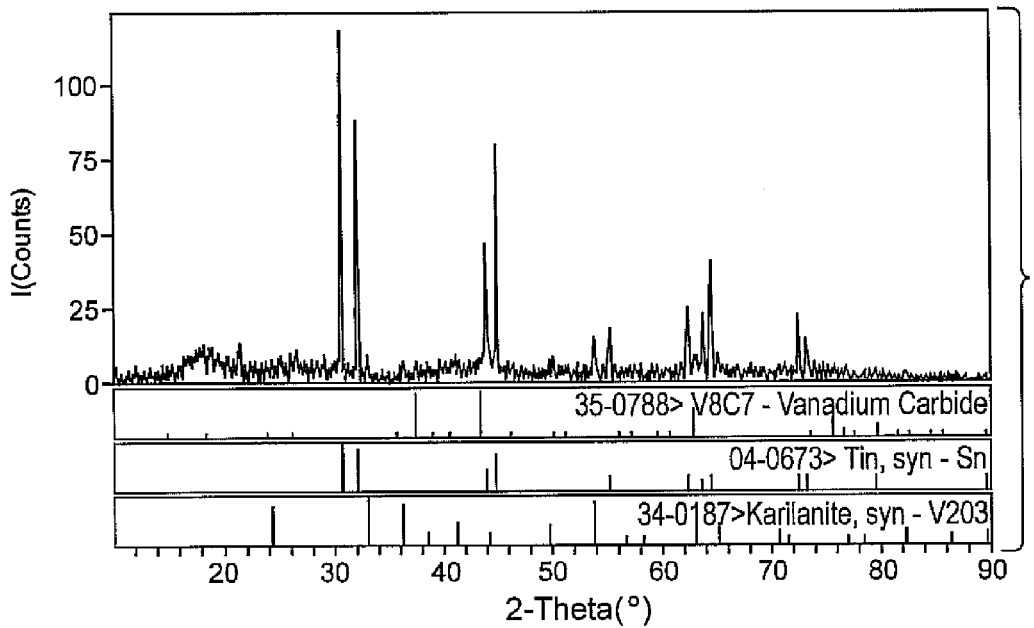
FIG. 2 depicts X-ray diffraction spectroscopy data for the material produced in the reaction profiled in FIG. 1.

C. to 900° C. over a period of 20 minutes. Thereafter, the mixture is held at the temperature of 900° C. for approximately 1 hour. In this second stage of the reaction, the tin oxide is reduced to tin metal. Since the tin is encapsulated by the vanadium carbide, coalescence of the molten tin is reduced. In addition, the thus formed VC matrix is porous, and the molten tin will infiltrate pores of the matrix thereby producing a nanodispersion. Following completion of the reaction, the mixture is cooled under inert conditions. The thus produced composite material may then be ground to an appropriate particle size for further use in a sulfur-reducing application. X-ray diffraction spectroscopy of the thus produced material confirmed that conversion from oxides to vanadium carbide in tin metal is complete. Such data is summarized in FIG. 2.

In a series of experiments, the performance of thus prepared materials was evaluated with regard to their ability to remove sulfur from a gaseous mixture of $H_2S$, $CO_2$, CO, $H_2$, $H_2O$, and $N_2$. This mixture approximates the composition of reformate gases used in fuel cells. It was found that the materials of the present invention have a very high selectivity for sulfur compounds. During the testing, $H_2S$ was removed from the feedstock stream and concentrations of the remaining gases remained stable. Furthermore, no sign of methanation was detected, further confirming the high sulfur selectivity of these materials.

In a bench scale series of experiments, reactor beds containing 2-4 grams of the composite were loaded into a stainless steel reactor cell having an interior diameter of approximately 2.06 inches. The cell was disposed in a tube furnace which was used to regulate the temperature of the reaction bed. The reaction gases were introduced into a manifold through electronic mass flow controllers. A high pressure liquid chromatography pump was used to introduce the water component into the manifold, and a calibrated $H_2S/N_2$ cylinder was used to provide the desired concentration of $H_2S$. The gases were mixed in the manifold and the gas blend was passed through a valve system into the reactor. Both input and effluent gases were analyzed by gas chromatography utilizing flame photo-ionization detection (FPD) and a Restek RTX-1 column for sulfur analysis. The sulfur detection limit of the FPD detector is 0.1 ppmv. Total sulfur levels were also detected utilizing an HP 5890 GC equipped with a sulfur chemiluminescence detector (SCD). The detection capability of the system was 10 ppbv. Online infrared analysis was used for continuous CO and $CO_2$ measurements.

Figure 3:
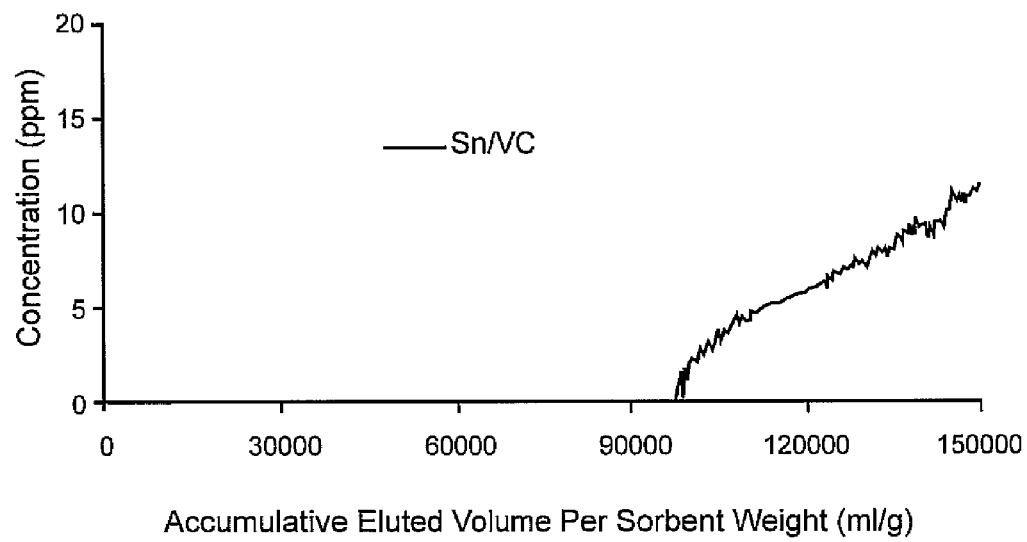
FIG. 3 shows sulfur breakthrough data for the material produced in the reaction profiled in FIG. 1.

FIG. 3 shows sulfur breakthrough data for a particular bench scale experimental series carried out at 270° C., utilizing 1 gram of the material of the present invention and a feedstock which included 20% water. It was found that this material showed a capacity of 3.85 weight percent for sulfur, and the 1 gram sample of material rendered more than 95 liters of a 300 ppm $H_2S$ feed sulfur free (less than 1 ppm). In another experimental series, a comparable Sn/VC material showed a breakthrough of sulfur capacity of about 6 weight percent. X-ray diffraction data confirms the presence of tin sulfide in the depleted material. Performance characteristics of the material of the present invention exceed those of conventionally employed ZnO sulfur-absorbent materials.

The methods of the present invention may be readily scaled up to produce large amounts of the composite absorbent material. Furthermore, it has been found that the materials of the present invention retain their sulfur-absorbing ability even when used in large scale installations. A series of large scale tests were carried out, and for each test a constant volume of 800 cubic centimeters of material was used. The bed depth in the reactor was approximately 14.5 inches. This gives an aspect ratio of approximately 7 which is sufficient to eliminate sulfur slippage. The baseline condition for each test utilized a total flow rate of 20 slpm, a constant GHSV of 1500 h−1 and a gas composition of 60% $H_2$, 20% $H_2O$, 10% CO, 10% $CO_2$, and 300 ppmv of $H_2S$. These conditions represent a reformate stream for a 1 kilowatt fuel cell system. Each test run lasted approximately 300 hours or until sulfur breakthrough was observed. When breakthrough did not occur after 300 hours, accelerated conditions were used to achieve breakthrough. In these cases $H_2S$ concentration was increased to 1,000 ppmv. Tests were run both at room temperature and at elevated temperatures of approximately 250-270° C. Data from the foregoing experimental series showed that the materials of the present invention exceed conventionally employed ZnO materials.

Figure 4:
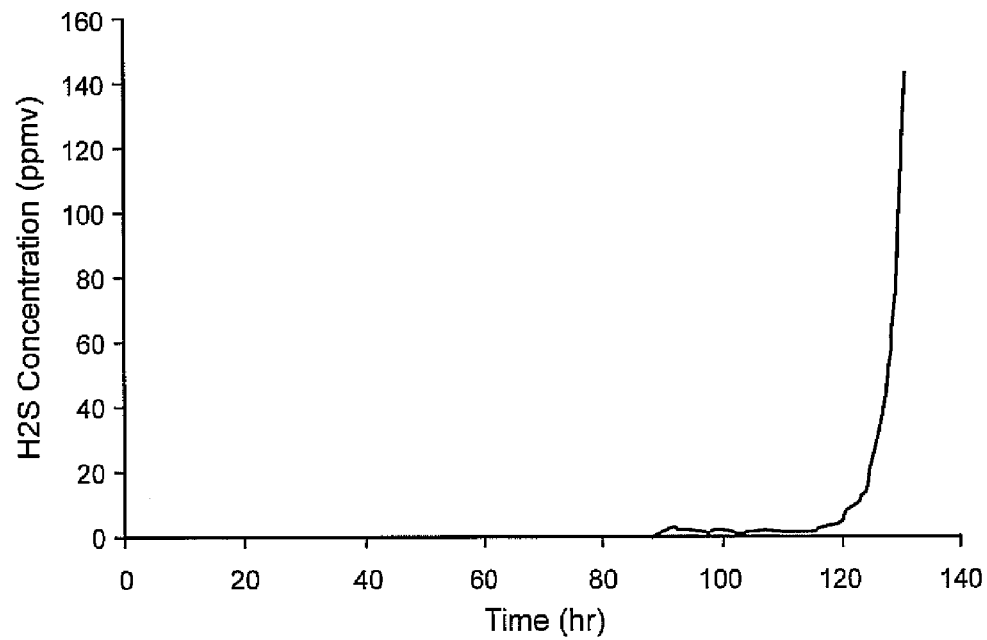
FIG. 4 shows sulfur breakthrough data for a material of the present invention, as evaluated in a large-scale test.

A particular large scale test, as summarized in FIG. 4, was carried out under actual use conditions wherein a reformate produced from JP8 was desulfurized. The reformate comprised 55-60% $H_2$, 12-15% CO, 10-12% $CO_2$, 20% $H_2O$ and 300 ppmv of $H_2S$. This reformate strain was flowed through an absorber unit packed with 800 cc of the absorbent material of the present invention, which comprised 565 grams. This amount of material was found to be capable of desulfurizing the reformate stream at a flow rate of 20 liters per minute, at an operational temperature of 270° C. These conditions correspond to the operation of a fuel cell at 1 $KW_e$. The cell operated for about 120 hours which corresponded to a sulfur-absorption capability for the material of approximately 10% by weight, exceeding bench scale testing. This suggests that the material has the capability to remove sulfur on a very large scale in actual operation. Undesirable methanation did not occur in the operation of the absorbent. Data for sulfur breakthrough is summarized in FIG. 4.

Not only are the materials of the present invention very efficient at removing sulfur from feedstocks, it has also been found that they may be readily regenerated for reuse. In that regard, it has been found that spent materials of the present invention may be readily regenerated by heating them to an elevated temperature under a reducing atmosphere. Specifically, it has been found that the materials may be readily regenerated by heating them to a temperature of 600-700° C. in a hydrogen-containing atmosphere. Regenerated materials were evaluated with regard to sulfur breakthrough as described above, and it has been found that the regenerated materials have a capacity of more than 98% that of the fresh materials. While not wishing to be bound by speculation, it is presumed that the presence of the ceramic matrix serves to inhibit reagglomeration of the metal during conditions of both regeneration and use thereby preserving its high surface area nanostructure.

The foregoing demonstrates that the present invention provides for the preparation of highly efficient and economically practical materials for removing undesirable sulfur compounds from feedstocks used in fuel cell and other chemical reactors. The foregoing experiments and examples describe the production of composite materials based upon the use of tin as a low melting sulfur-absorbing metal. However, it is to be understood that one of skill in the art would understand and expect that like results will be obtained utilizing other reactive, relatively low melting metals including zinc, lead, and bismuth. One of skill in the art could readily carry out the synthesis and use of the materials of the present invention with these metals. Likewise, while vanadium carbide has been described as the ceramic matrix, other inert ceramic materials could likewise be employed, keeping in mind that the relative melting point of the metal precursor and ceramic precursor must be as described herein. Also, it is to be understood that other materials such as silica, carbon, carbon precursors, and the like can be incorporated into the ceramic matrix provided that they are inert with regard to the metal and to materials found in the feedstock being processed.

In view of the foregoing, numerous modifications and variations of the present invention will be readily apparent to those of skill in the art. The foregoing drawings, discussion and description are illustrative of particular embodiments of the invention, but are not meant to be limitations upon the practice thereof. It is the following claims, including all equivalents, which define the scope of the invention.

The invention claimed is:

1. A multi-step method for preparing a composite material which comprises a ceramic matrix having a metal nanodispersed therein, said method including the steps of:
    providing a precursor of the ceramic matrix;
    providing a precursor of the metal, said precursor of the metal having a melting point which is greater than the melting point of the precursor of the ceramic matrix;
    mixing said precursor of the ceramic matrix and the precursor of the metal so as to produce a mixture comprised of particles of the precursor of the ceramic matrix and particles of the precursor of the metal;
    heating said mixture to a first temperature which is greater than the melting point of the precursor of the ceramic matrix and less than the melting point of the precursor of the metal, under conditions which will not convert said precursor of said ceramic matrix to said ceramic matrix and said precursor of said metal to said metal, whereby the particles of the precursor of the metal are at least partially coated with the precursor of the ceramic matrix;
    carrying out a conversion reaction which converts the precursor of the ceramic matrix into said ceramic matrix wherein said ceramic matrix is porous, said reaction being carried out in a carburizing atmosphere, and at a second temperature which is less than the melting point of the precursor of the metal; and
    carrying out a conversion reaction which converts the precursor of the metal to said metal, said reaction being carried out in a reducing atmosphere, and at a third temperature which is greater than said second temperature, so as to produce said composite material.

2. The method of claim 1, wherein the precursor of the ceramic matrix is a vanadium-oxygen material, and the reaction which converts the precursor of the ceramic matrix is a carburizing reaction which converts the vanadium oxide precursor to a vanadium carbide ceramic.

3. The method of claim 2, wherein the vanadium-oxygen material is selected from the group consisting of an oxide of vanadium, ammonium vanadate, and combinations thereof.

4. The method of claim 1, wherein said metal is selected from the group consisting of tin, zinc, lead, bismuth, and combinations thereof.

5. The method of claim 1, wherein said precursor of said metal is an oxide or a sulfide of said metal.

6. The method of claim 1, including the further steps of:
    providing an agglomeration inhibitor; and
    mixing said agglomeration inhibitor with said precursor of the ceramic matrix and said precursor of the metal.

7. The method of claim 6, wherein said agglomeration inhibitor is silica.

8. The method of claim 1, wherein amounts of said precursor of the ceramic matrix and said precursor of the metal are selected so that the weight percentage of metal present in the composite material is in the range of 60-70%.

9. The method of claim 1, wherein said carburizing atmosphere includes a hydrocarbon gas.

10. The method of claim 1, wherein said reducing atmosphere includes hydrogen.

\* \* \* \* \*